C. W. KENNEDY.
FOUR WHEEL DRIVE MECHANISM.
APPLICATION FILED OCT. 6, 1917.
1,270,167.
Patented June 18, 1918.
2 SHEETS—SHEET 1.
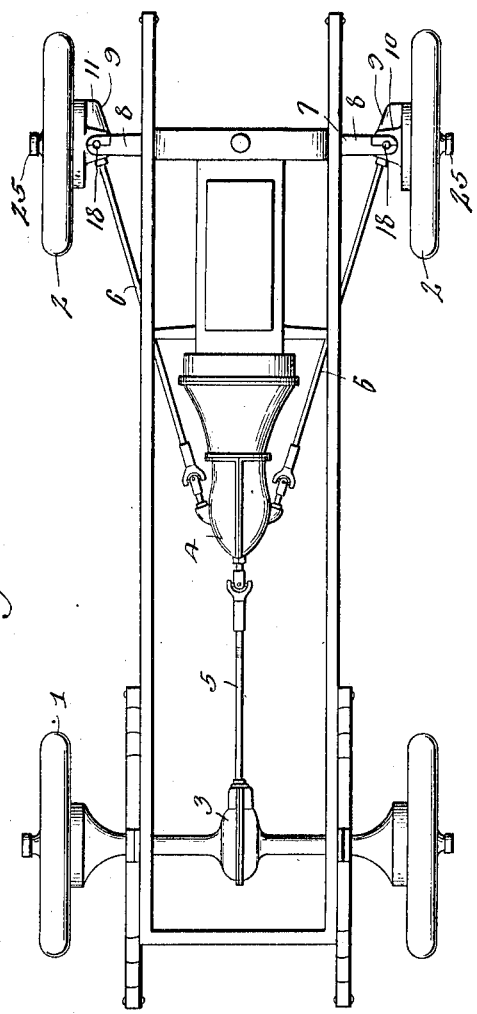
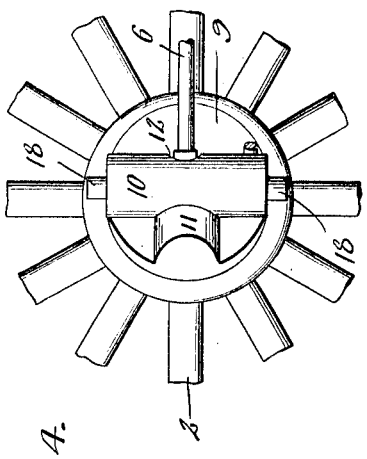

C. W. KENNEDY.
FOUR WHEEL DRIVE MECHANISM.
APPLICATION FILED OCT. 6, 1917.
1,270,167.
Patented June 18, 1918.
2 SHEETS—SHEET 2.
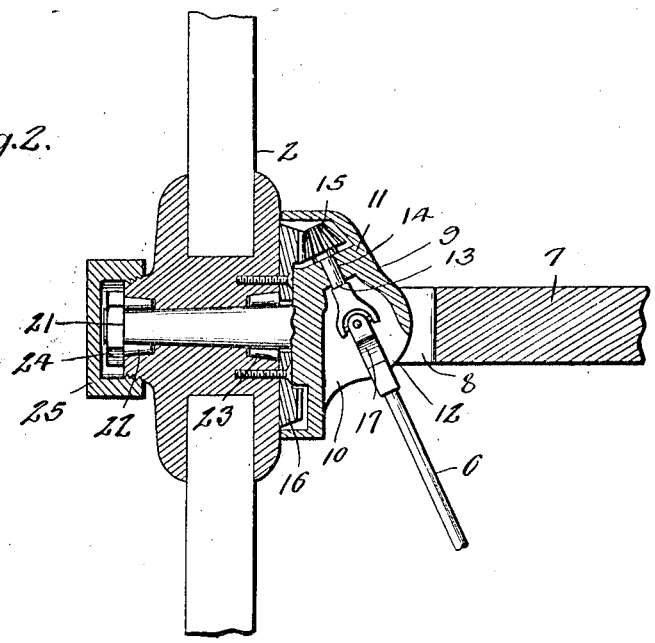
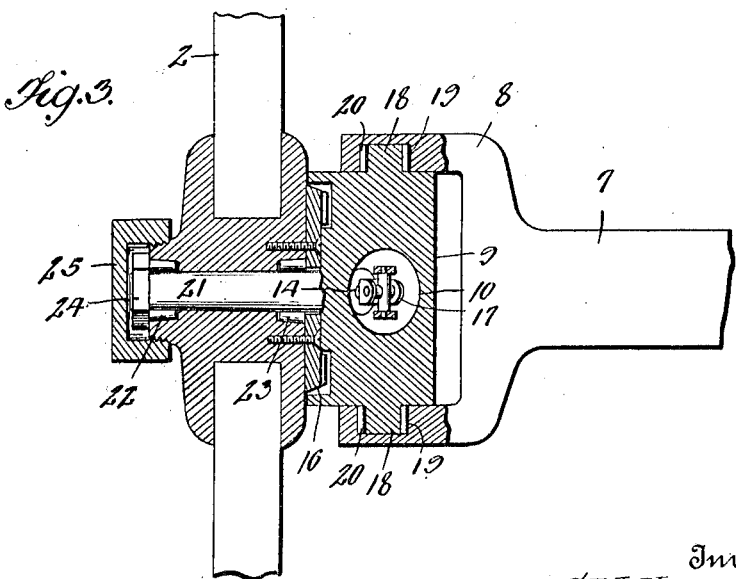
Inventor
C. W. Kennedy,
By Victor J. Evans
Attorney
Witnesses

UNITED STATES PATENT OFFICE.

CHARLES W. KENNEDY, OF CLARENCE, MISSOURI.

FOUR-WHEEL DRIVE MECHANISM.

1,270,167. Specification of Letters Patent. Patented June 18, 1918.

Application filed October 6, 1917. Serial No. 195,114.

*To all whom it may concern:*

Be it known that I, CHARLES W. KENNEDY, a citizen of the United States, residing at Clarence, in the county of Shelby and State of Missouri, have invented new and useful Improvements in Four-Wheel Drive Mechanisms, of which the following is a specification.

This invention relates to four wheel drive mechanism and particularly to the means for driving the front steering wheels of the motor vehicle without interfering with the steering movement of said wheels.

The object of the invention is to provide efficient means for driving the steering wheels of the vehicle which means shall include a minimum number of parts, the main or essential features of which are housed and adapted to run in oil, the said means also providing for the differential speed of the front wheels with relation to each other and to the rear wheels, enabling the power of the engine to be distributed to all four of the wheels whether the vehicle is proceeding straight away or making a turn.

With the above and other objects in view, the invention consists in the novel construction, combination and arrangement of parts, herein fully described, illustrated and claimed.

In the accompanying drawings:—

Figure 1 is a general plan view of the chassis of a motor vehicle showing the improved driving gear.

Fig. 2 is an enlarged horizontal section taken in line with one of the steering wheel spindles.

Fig. 3 is a vertical section, showing the same parts, taken in line with the steering wheel spindle.

Fig. 4 is a fragmentary perspective view looking toward the inner face of one of the steering knuckles.

Referring to the drawings 1 designates the rear driving wheels of a motor vehicle, 2 the front steering wheels thereof, 3 the rear differential gearing and 4 the front wheel differential gearing from which a driving shaft extends to the rear differential gearing. From the front differential gearing 4, two front wheel driving shafts 6 extend divergently toward the opposite ends of the front axle 7 which is provided at the opposite ends thereof with the usual forks 8 to pivotally receive the steering knuckles.

In connection with each steering wheel 2, I employ a combined knuckle and gear housing 9, the formation of which is best illustrated in Fig. 4. The knuckle 9 embodies a cylindrical tubular vertical portion 10 and a substantially horizontal tubular portion 11, the portions 10 and 11 being in communication with each other. The knuckle also comprises a tubular opening 12 for the driving shaft 6.

The shaft 6 is of sectional construction and embodies in addition to the main section thereof, a short section 13 which is mounted in an internal bearing 14 within the horizontal portion 11 of the knuckle. The short shaft section 13 has fast thereon a pinion 15 which meshes with a gear face or ring gear 16 having a fixed relation to the adjacent inner face of the hub of the steering wheel. The short shaft section 13 is connected to and driven from the main section of the shaft 6 by means of a universal joint 17 the pivotal center of which is directly in line with the axis of turning movement of the steering wheel. The pivotal connection between the knuckle 9 and the adjacent fork 8 comprises upper and lower pintles or trunnions 18 which are received in corresponding sockets 19 in the fork arms of the axle, roller bearings 20 being preferably arranged around the pintles or trunnions 19 to reduce friction.

Extending outwardly from each knuckle 9 is a spindle 21 upon which the hub of the adjacent steering wheel is journaled, friction being reduced by means of roller bearings 22 and 23. A nut 24 is threaded on the outer end of the spindle to hold the wheel in place and is covered and protected by a cap 25 threaded on the wheel hub.

By means of the construction hereinabove described it will be seen that I do away with a rotating front axle. Instead thereof, I employ forwardly diverging front wheel driving shafts and by providing each of said driving shafts with a universal joint in line with the axis of turning movement of the adjacent steering wheel, I am enabled to impart motion directly to each of the steering wheels of the vehicle without interfering in any way with the steering mechanism of the vehicle.

I claim :—

1. The combination with a motor vehicle steering wheel, of a combined steering wheel knuckle and housing, a ring gear having a fixed relation to the inner face of the steering wheel, a front wheel driving shaft embodying a plurality of sections connected by a universal joint, and a pinion fast on one section of said driving shaft, and meshing with said ring gear, said combined knuckle and housing embodying a substantially vertical hollow cylindrical portion and also comprising a substantially horizontal cylindrical and hollow portion, said vertical and horizontal portions communicating with each other and forming housings for said universal joint and pinion, and adapting the last named parts to be run in lubricant.

2. The combination with a motor vehicle steering wheel, of a combined steering wheel knuckle and housing, a ring gear having a fixed relation to the inner face of the steering wheel, a front wheel driving shaft extending obliquely of the chassis of the vehicle and consisting of long and short sections connected by a universal joint the pivotal axis of which is in line with the axis of movement of the steering wheel, and a pinion fast on the shorter section of said driving shaft meshing with said ring gear, said combined knuckle and housing embodying a substantially vertical hollow cylindrical portion and also comprising a substantially horizontal cylindrical and hollow portion, said vertical and horizontal portions communicating with each other and forming housings for said universal joint and pinion, adapting the last named parts to be run in lubricant.

In testimony whereof I affix my signature.

CHARLES W. KENNEDY.

Copies of this patent may be obtained for five cents each, by addressing the "Commissioner of Patents, Washington, D. C."